Nov. 18, 1969  W. R. COTHRAN  3,478,437
INCLINOMETER
Filed July 5, 1967

INVENTOR
WADE R. COTHRAN
BY *Tipton D. Jenings*
ATTORNEY

United States Patent Office 3,478,437
Patented Nov. 18, 1969

3,478,437
INCLINOMETER
Wade R. Cothran, Arlington County, Va., assignor to The Susquehanna Corporation, a corporation of Delaware
Filed July 5, 1967, Ser. No. 651,244
Int. Cl. G01c 9/02, 9/10
U.S. Cl. 33—206                                   7 Claims

ABSTRACT OF THE DISCLOSURE

One embodiment of the inclinometer utilizes a potentiometer in which one or more sections are shorted-out or bypassed by an inclinable mercury switch to vary the resistance of the potentiometer. The potentiometer output voltage is applied to a storage capacitor. Thereafter, this capacitor is incrementally discharged. The number of steps needed to discharge the capacitor to a preset threshold level is an indication of the angle of inclination.

BACKGROUND OF THE INVENTION

The present invention relates to inclinometers, and more particularly to a device for determining the angle of inclination of an object.

In the past a number of devices have been used for measuring or determining the angle of inclination of objects, particularly where the object of concern may be remotely located or otherwise not directly observable. An example of an application for such a device is in the measurement of underwater currents by apparatus known as ocean current meters. If such apparatus is inclined from the vertical by the force of the current when current measurements are being taken, then an error will exist in the current reading unless compensation is made for this inclination. Thus, means must be provided to measure the angle of inclination of the ocean current meter. The data collected on the inclination angles is then used to compute later the true current readings.

In prior art inclinometers, one serious disadvantage is that errors can arise if a change of inclination occurs during the collection of data. If the angle of inclination increases or decreases, then both the new and old readings may appear in the indicating apparatus or output data. This redundancy would make it impossible to correct or compute accurately the primary measurement and accordingly may render the primary data useless.

SUMMARY

The present invention is directed to an improved inclinometer comprising a variable resistance means whose resistance is varied in response to inclination. In circuit with the resistance means is apparatus for sensing the change in resistance and includes storage means responsive to the resistance of the resistance means. Also included are means for periodically sampling the storage means to effect an indication of the angle of inclination of the inclinometer.

One advantage of the present invention is the elimination of redundacy while measurements are being taken. In contrast with the prior art, once a measurement begins, a change in the angle of inclination does not affect readout. The angle of inclination, at the beginning of the measurement, is stored in the storage means and once stored, this information is then read out to indicating circuitry. A change in the angle of inclination has no effect upon the status of the storage means. The data can be used to correct or correlate the primary measurements. By elimination of redundancy or readout errors, the primary data is not rendered useless.

It is an object of the present invention to provide an improved inclinometer for determining the angle of inclination of an object and effect an indication of such inclination.

Another object of the present invention is to provide such an inclinometer which is designed to eliminate, during measurement, errors caused by a change in inclination.

Another object of the present invention is to provide such an inclinometer which affords an improved reliability of operation and is primarily electrical in design.

Other objects and advantages will become apparent from a reading of the following specification taken in conjunction with the accompanying drawings.

DESCRIPTION OF THE PREFERRED EMBODIMENT

Figure 1:
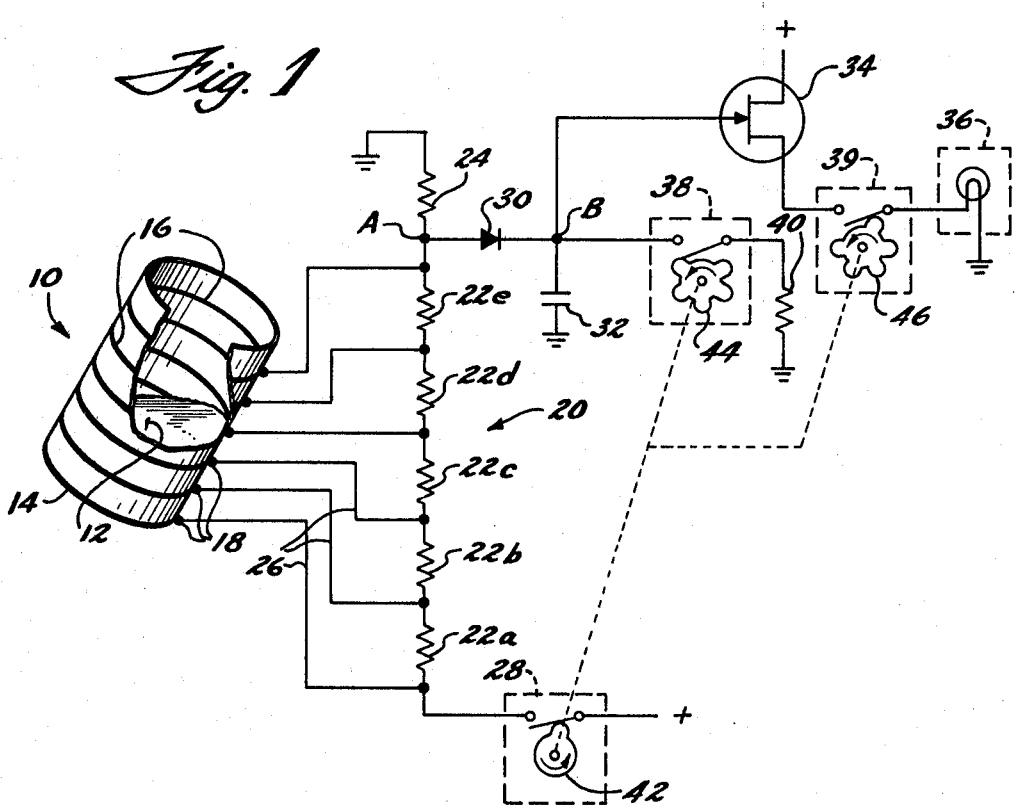
FIGURE 1 is a schematic diagram of the preferred embodiment of the invention.

Referring to FIGURE 1 there is shown an inclinometer having a receptacle 10 which is cylindrical in shape and contains a conductive liquid medium 12, such as mercury. The cylinder 10 has a conductive base 14 and a plurality of conductive rings 16 disposed along its length. The rings 16 are formed to provide electrical contact through the width of the cylinder 10. The remainder of the body between the rings 16 is made of a nonconductive material. Preferably, the top of the cylinder 10 is closed to provide a tightly-sealed switch member. Terminals or contacts 18 are formed on the surface of the cylinder at the base 14 and each ring 16. As an alternative embodiment of this cylindrical switch member, reference is made to a similar switch shown in the Feyling Patent 3,253,280, which may be used.

Connected to the cylinder 10 is a potentiometer 20 which is formed of a series of resistors 22a–22e. The potentiometer in combination with the resistor 24 forms a voltage divider whose output is taken at point A. Each contact 18 of cyclinder 10 is connected to the potentiometer by leads 26. Contact 18 of the base 14 is connected to the high-voltage end of potentiometer 20. Each successive contact 18, and thereby each successive ring 16, is connected to successive junctions of the resistors 22 of potentiometer 20. For example, as shown, the first ring 16 is connected to the junction between resistors 22a and 22b. The second ring is connected to the junction between resistors 22b and 22c. This arrangement continues through the top-most ring 16 which is connected to the low-voltage end of the potentiometer. A switch 28 is connected between potentiometer 20 and a source of potential.

The output from point A is supplied through a diode 30 to point B. Connected to point B is a storage capacitor 32 and a transistor 34. This transistor 34 is here shown to be a field-effect type which provides a high-input impedance to prevent leakage from capacitor 32 through this transistor. Connected in the output circuit of transistor 34 is a lamp 36 which serves to provide an indicating signal in response to the closing of switch 39. Also connected to capacitor 32 is another switch 38, which is in turn connected to resistor 40. The other side of this resistor is at ground.

The switches 28, 38, and 39 are coordinated or synchronized in their operation with one another. In the schematic showing of FIGURE 1, these three switches are shown as having cam members 42, 44, and 46 respectively. These cams are slaved so that in operation cam 42 closes switch 28 once, and then cams 44 and 46 close switches 38 and 39 a number of times thereafter before switch 28 again closes. It is to be understood that the cam arrangement as shown is but an illustrative embodiment of a synchronized switching arrangement, and obviously other means such as electronic timing or distributor circuits synchronized with an electronic clock could be used as well.

OPERATION

Receptacle 10 functions as a mercury switch. When the receptacle 10 is vertically at rest, the mercury 12 contacts the inside of base 14 but none of the rings 16. Receptacle or cylinder 10 is designed to be tilted by means not shown and, as an example, can be attached to apparatus such as the ocean current meter, discussed previously. When the ocean current meter swings away from the vertical, the mercury 12 will progressively establish electrical continuity between the base 14 and one or more of the rings 16.

The rings 16 are positioned so that each represents a discrete angle of inclination. For example, here each ring above base 14 represents an angle of 5°; and for the five-ring embodiment shown, this represents a maximum angle of 25°. Obviously, more rings can be added by elongating the cylinder to permit greater angles to be detected. Also, the spacing between the rings can be changed to enable smaller or larger increments of inclination to be detected.

The potentiometer 20 is variable in that one or more of its resistors 22 are bypassed or shorted out depending upon the angle of inclination of the cylindrical receptacle 10. For example, as shown, the resistors 22a, 22b, and 22c are bypassed by the mercury making contact between base 14 and the third ring 16 above the base. When switch 28 is closed, only the resistors 22d, 22e, and 24 form the voltage divider and determine the voltage at point A. If each ring represents 5°, the voltage level at point A will be indicative of a 15° tilt, and this voltage will be stored and read out as later described. Thus, depending on the angle of tilt or inclination, the voltage at point A will go from a minimum when the cylindrical receptacle is vertical to a maximum of essentially the supply voltage when the receptacle is at maximum tilt and bypasses all of the resistors 22 in the potentiometer 20.

Figure 2:
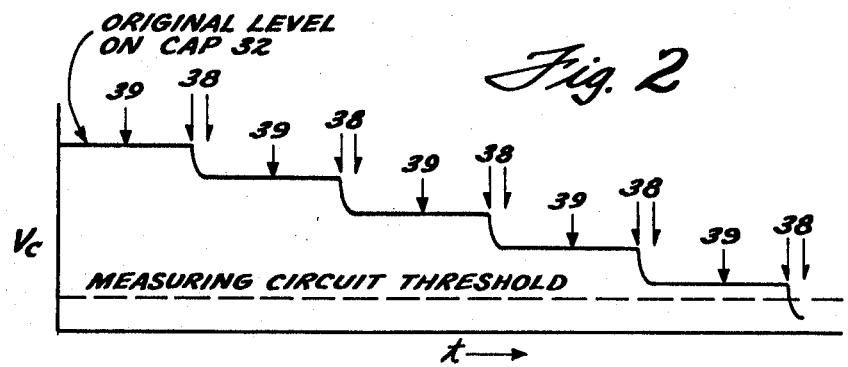
FIGURE 2 is a waveform showing the voltage level at point B in FIGURE 1 at successive points in time during operation of the invention.

Assume for the present discussion that the cylinder 10 is tilted to 25°. When switch 28 is closed by cam 42, all resistors 22 are bypassed, and point A rises to approximately supply potential. Diode 30 becomes forward biased, and capacitor 32 charges. Switch 28 is designed to remain closed sufficiently long for capacitor 32 to draw the desired charge. In the waveform of FIGURE 2, there is shown at time zero the charge which is stored on capacitor 32. This also represents the voltage level at point B.

The indicating circuitry is formed as a threshold device and preferably provides a high-impedance input to capacitor 32. The threshold is preferably chosen to be above the voltage level at point B when the receptacle 10 is at the vertical position, and this threshold level is shown in FIGURE 2. As long as point B (or capacitor 32) remains above this threshold, an indication can be achieved. For the present example, point B is above this level and transistor 34 is forward-biased.

With capacitor 32 now charged and switch 28 again open, switches 38 and 39 will periodically and alternately close to permit a predetermined amount of charge to be discharged through resistor 40, and an indication to be attained. For the present example it will take five closings of switch 38 for the charge on capacitor 32 to drop to the threshold level. This is accomplished in five discrete steps as shown in FIGURE 2. The width of arrow 38 in FIGURE 2 has been exaggerated to show that the switch 38 will remain closed for a predetermined period of time to permit the desired amount of charge to flow out of capacitor 32.

While capacitor 32 is at the original charge level, switch 39 which operates before switch 38 is closed momentarily by cam 46 and lamp 36 flashes. Preferably the operations of switch 39 occur halfway between the operations of switch 38, as shown by the arrows labeled "39" in FIGURE 2. As switch 39 is closed at each subsequent level, the lamp 36 flashes until such time as point B drops below the threshold level. If the light from lamp 36 is focused onto a moving film (not shown) then successive dots will appear on the film as the lamp flashes at each level. As shown by a count of arrows 39 in FIGURE 2, lamp 36 will flash five times for the present example. With each ring worth 5°, an angle of inclination of 25° has been measured.

For a second example, assume that only the three resistors 22a, 22b and 22c, are bypassed, representative of a 15° inclination. Capacitor 32 will charge initially only to the third level shown in FIGURE 2 when switch 28 is closed. During the subsequent sampling or readout cycle capacitor 32 and thereby point B fall below the threshhold level after only three closings of switch 38. Lamp 36 flashes at the original level and at each of the following two levels in response to the operation of switch 39. Once point B falls below the threshold level, transistor 34 goes non conducting and subsequent closings of switch 39 have no effect on lamp 36 and it remains dark.

One significant advantage attained with the present invention is that the readout cycle is not affected by a change in inclination. As has been shown, switch 28 closes and a voltage is stored in capacitor 32. Then switch 28 opens and switches 38 and 39 begin their cycle. Even if the inclinable member 10 changes its angle of tilt during the readout cycle, there is no effect on the system because switch 28 is now open and only ground potential appears at point A. Note also that diode 30 is back-biased during this readout portion and leg AB is eliminated as a discharge path for capacitor 32. Thus, capacitor 32 is permitted to discharge in the manner described above to present an indication of the angle of tilt as it existed during the read-in or storage cycle. Once readout is complete, another measurement of inclination can take place immediately by repeating the above-described procedure beginning with the closing of switch 28. Or if desired, the entire measurement cycle can be delayed by appropriate timing means until a new reading is desired.

Because of the exponential discharge of capacitor 32, resistors 22 are preferably graded in value so that capacitor 32 is charged to the proper level depending upon which of the resistors are in the charging circuit. Alternatively, to attain the desired charge-discharge waveforms, other parameters such as supply voltage, capacitor size and switching time can be readily controlled.

It will be apparent that various modifications may be made herein within the spirit and scope of the invention and it is desired, therefore, that only such limitations be placed upon the invention as are imposed by the prior art.

What is claimed is:

1. A device for determining inclination comprising variable resistance means, means for varying the resistance of said resistance means in response to inclination by bypassing at least a part of the resistance of said resistance means, sensing means electrically connected to said resistance means and being electrically responsive to a voltage level presented by said resistance means as established by said varying means, said sensing means including a storage capacitor for drawing a charge substantially equal to said voltage level, means for periodically sampling said capacitor, said sampling means including a switch which operates at predetermined intervals to cause said storage capacitor to discharge in incremental steps, and means for effecting an indication of inclination as determined by the state of the charge on said capacitor.

2. A device as claimed in claim 1 wherein said variable resistance means is a potentiometer and wherein said device further comprises a voltage supply and a switch for periodically applying said voltage supply to said potentiometer to present said voltage level.

3. A device as claimed in claim 4 wherein said varying means comprises a mercury switch having a plurality of contacts which are connected to said potentiometer, the resistance of said potentiometer being varied according to the part of the potentiometer which is bypassed by contacts brought to the same potential level by the mercury in the mercury switch.

4. Apparatus as claimed in claim 1 wherein said means for effecting an indication includes a threshold device, said threshold device being operative to provide an indication of inclination so long as the charge on said capacitor remains above the threshold of said threshold device.

5. A device as claimed in claim 4 wherein said threshold device includes a switch and a lamp, and means for closing said switch and illuminating said lamp at each step of said storage capacitor discharge so long as the charge on said capacitor remains above said threshold.

6. A device for measuring inclination comprising a potentiometer, an inclinable member, a conductive liquid medium, said inclinable member being adapted to receive said liquid medium, said inclinable member having a plurality of conductive contacts, and said liquid medium being disposed to establish electrical continuity between various contacts depending upon the angle of inclination of said inclinable member, each contact being connected to a predetermined point on said potentiometer, said potentiometer having an output whose voltage is dependent upon the angle of inclination of said inclinable member, a storage capacitor connected to said output of said potentiometer for drawing a charge substantially equal to the voltage output of said potentiometer, level-sensitive output means for providing an indicating signal when the charge on said capacitor exceeds a predetermined level, a switch connected to said capacitor, and means for periodically closing said switch to discharge said capacitor in discrete steps, the number of switch closings necessary for the charge on said capacitor to fall to said predetermined level in conjunction with said indicating signal affording a measurement of the angle of inclination of said inclinable member.

7. A device as claimed in claim 6, wherein said level-sensitive output means includes a second switch and a lamp, and means for closing said switch and illuminating said lamp at each step of said capacitor discharge so long as the charge on said capacitor is above said predetermined level.

References Cited
UNITED STATES PATENTS 2,155,865   4/1939   Leavenworth.
2,999,206   10/1961   Stoddart _____ 324—140

LEONARD FORMAN, Primary Examiner

D. A. DEARING, Assistant Examiner

U.S. Cl. X.R.
73—170; 320—1

UNITED STATES PATENT OFFICE
CERTIFICATE OF CORRECTION

Patent No. 3,478,437          Dated 18 November 1969

Inventor(s) W. R. Cothran

It is certified that error appears in the above-identified patent and that said Letters Patent are hereby corrected as shown below:

Claim 3, Column 5, Line 1: "4" should be --2--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents